United States Patent
Xiang et al.

(10) Patent No.: US 11,868,156 B2
(45) Date of Patent: Jan. 9, 2024

(54) TOUCH-CONTROL PANEL AND TOUCH-CONTROL DISPLAY APPARATUS

(71) Applicant: BOE TECHNOLOGY GROUP CO., LTD., Beijing (CN)

(72) Inventors: Dalin Xiang, Beijing (CN); Zewen Bo, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 17/641,726

(22) PCT Filed: Apr. 9, 2021

(86) PCT No.: PCT/CN2021/086043
§ 371 (c)(1),
(2) Date: Mar. 9, 2022

(87) PCT Pub. No.: WO2021/232991
PCT Pub. Date: Nov. 25, 2021

(65) Prior Publication Data
US 2022/0300110 A1 Sep. 22, 2022

(30) Foreign Application Priority Data
May 22, 2020 (CN) .......................... 202010441849.8

(51) Int. Cl.
*G06F 3/044* (2006.01)
*G06F 3/041* (2006.01)

(52) U.S. Cl.
CPC .......... *G06F 3/0443* (2019.05); *G06F 3/0446* (2019.05); *G06F 3/04164* (2019.05); *G06F 2203/04111* (2013.01)

(58) Field of Classification Search
None
See application file for complete search history.

(56) References Cited

U.S. PATENT DOCUMENTS

2017/0168609 A1 6/2017 Chang et al.
2017/0337411 A1* 11/2017 Liu ..................... G06V 40/1306
(Continued)

FOREIGN PATENT DOCUMENTS

CN 102053751 A 5/2011
CN 104536635 A 4/2015
(Continued)

OTHER PUBLICATIONS

International Search Report and Written Opinion for International Application No. PCT/CN2021/086043 dated Jul. 7, 2021.

Primary Examiner — Duane N Taylor, Jr.
(74) Attorney, Agent, or Firm — Perilla Knox & Hildebrandt LLP; Kenneth A. Knox

(57) ABSTRACT

A touch-control panel and a touch-control display apparatus. The touch-control panel comprises a touch-control sensing layer with a plurality of touch-control units, wherein each of the touch-control units comprises at least one touch-control pattern, with the touch-control pattern comprising a first touch-control electrode and a second touch-control electrode that are insulated from each other. The first touch-control electrode is provided with at least one first touch-control group, with the first touch-control group comprising a plurality of first touch-control branches and first conductive connection portions which are separately connected to one end of each of the plurality of first touch-control branches. The second touch-control electrode is provided with at least one second touch-control group, with the second touch-control group comprising a plurality of second touch-control branches and second conductive connection portions which are separately connected to one end of each of the plurality of second touch-control branches.

15 Claims, 8 Drawing Sheets

(56) References Cited

U.S. PATENT DOCUMENTS

| | | | |
|---|---|---|---|
| 2018/0004341 A1 | 1/2018 | Yeh et al. | |
| 2018/0173062 A1* | 6/2018 | Li | G02F 1/13439 |
| 2019/0073070 A1 | 3/2019 | Tseng | |
| 2021/0191568 A1* | 6/2021 | Zhang | G06F 3/0443 |

FOREIGN PATENT DOCUMENTS

| | | | | |
|---|---|---|---|---|
| CN | 106855765 A | | 6/2017 | |
| CN | 108196736 A | | 6/2018 | |
| CN | 108628483 A | | 10/2018 | |
| CN | 110764660 A | | 2/2020 | |
| CN | 106816460 B | * | 4/2020 | G06F 3/041 |
| CN | 110968221 A | | 4/2020 | |
| CN | 111625139 A | | 9/2020 | |
| TW | 201430666 A | | 8/2014 | |
| TW | 201721389 A | | 6/2017 | |
| TW | I588728 B | | 6/2017 | |
| WO | 2021056877 A1 | | 4/2021 | |

\* cited by examiner

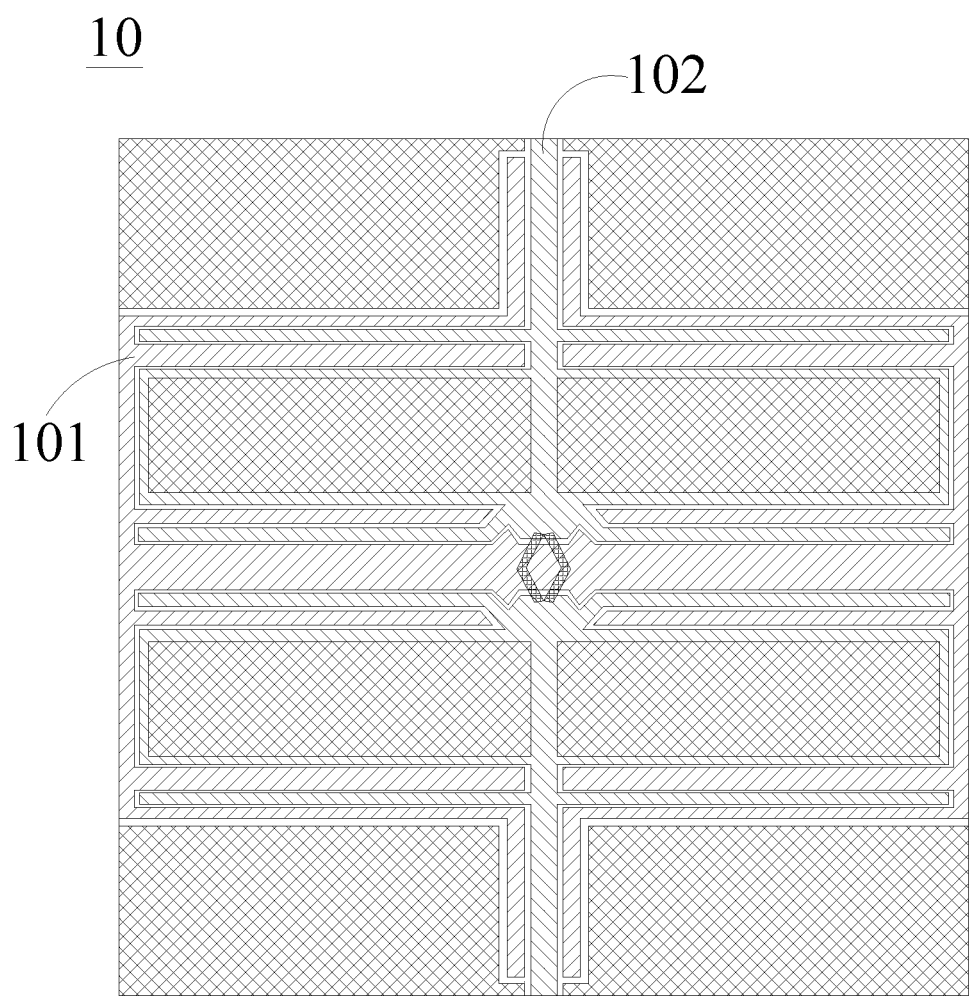
FIG. 1 *(Prior Art)*

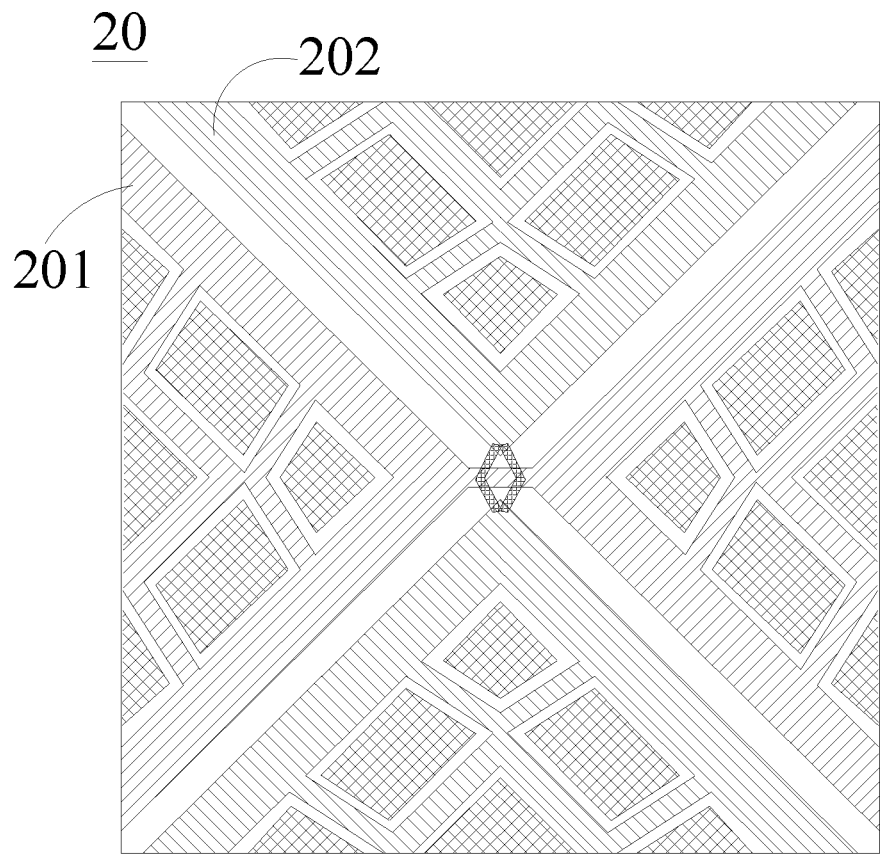
FIG. 2 *(Prior Art)*
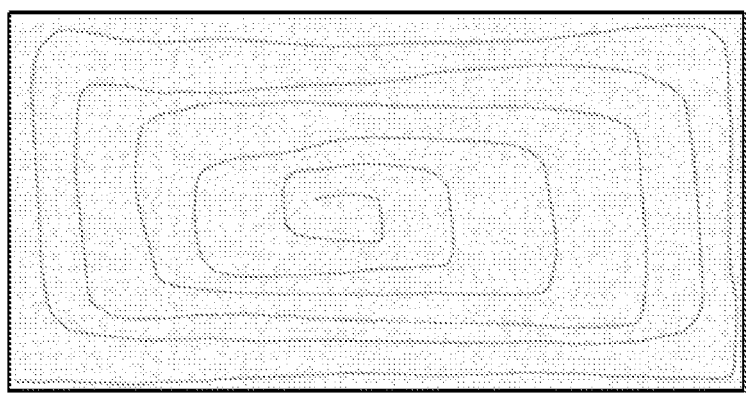
FIG. 3

TOUCH-CONTROL PANEL AND TOUCH-CONTROL DISPLAY APPARATUS

CROSS-REFERENCE TO RELATED APPLICATIONS

The present application is a national phase application under 35 U.S.C. § 371 of International Application No. PCT/CN2021/086043, filed on Apr. 9, 2021, which claims the benefit of and priority to Chinese Patent Application No. 202010441849.8, filed on May 22, 2020, entitled "TOUCH-CONTROL PANEL AND TOUCH-CONTROL DISPLAY APPARATUS," the contents of both of which being incorporated by reference in their entireties herein.

TECHNICAL FIELD

The present disclosure relates to the field of touch-control technology and, in particular, to a touch-control panel and a touch-control display apparatus.

BACKGROUND

At present, display products are developing in the direction of lightness and thinness. However, as the thickness of display products becomes thinner, the LGM (Low Ground Mass) problem of the mutual capacitive touch-control panel has gradually become more prominent. Especially when the whole device is in a weak ground state and large-area touch-control and multi-point coaxial touch-control occur, due to the R-transmission effect, the change in mutual capacitance is small, and the touch-control chip basically cannot detect the change in mutual capacitance. Therefore, touch-control problems, such as low sensitivity, poor precision, jump points, ghost points, and so forth, are prone to occur.

SUMMARY

A touch-control panel and a touch-control display apparatus are provided.

More specifically, the present disclosure provides a touch-control panel, including a substrate and a touch-control sensing layer located on the substrate, wherein the touch-control sensing layer includes a plurality of touch-control units, each of the touch-control units includes at least one touch-control pattern, the touch-control pattern includes a first touch-control electrode and a second touch-control electrode that are insulated from each other;

the first touch-control electrode has at least one group of first touch-control group, the first touch-control group includes a plurality of first touch-control branches and first conductive connection portions connected to one end of the plurality of first touch-control branches;

the second touch-control electrode has at least one group of second touch-control group, the second touch-control group includes a plurality of second touch-control branches and second conductive connection portions connected to one end of the plurality of second touch-control branches, the second touch-control branches and the first touch-control branches are arranged alternately in a first direction and are spaced apart from each other, wherein surfaces of the first touch-control branches opposite to the second touch-control branches are wave-shaped surfaces; and/or surfaces of the second touch-control branches opposite to the first touch-control branches are wave-shaped surfaces.

In an exemplary embodiment of the present disclosure, opposite surfaces of the first touch-control branch in the first direction are both wave-shaped surfaces; opposite surfaces of the second touch-control branch in the first direction are both wave-shaped surfaces.

In an exemplary embodiment of the present disclosure, the wave-shaped surface is formed by splicing a plurality of tooth portions arranged in a second direction, and the second direction intersects with the first direction;

wherein tooth portions of the adjacent first touch-control branch and second touch-control branch are engaged with each other.

In an exemplary embodiment of the present disclosure, sizes, and shapes of the tooth portions of the first touch-control branch are identical with sizes and shapes of the tooth portions of the second touch-control branch; and each part in a channel formed between the adjacent first touch-control branch and second touch-control branch has an identical size in the first direction.

In an exemplary embodiment of the present disclosure, tooth portions on opposite sides of the first touch-control branch in the first direction are arranged in a staggered manner;

tooth portions on opposite sides of the second touch-control branch in the first direction are arranged in a staggered manner.

In an exemplary embodiment of the present disclosure, the tooth portion is triangular, arc-shaped, or trapezoidal.

In an exemplary embodiment of the present disclosure, when the tooth portion is triangular, an included angle between α side surface of the tooth portion and a plane where the first direction is located is 5° to 95°.

In an exemplary embodiment of the present disclosure, in the first touch-control electrode of each of the touch-control patterns, there are a plurality of groups of the first touch-control groups arranged in sequence in the first direction, and the first conductive connection portions of the adjacent first touch-control groups are connected with each other;

in the second touch-control electrode of each of the touch-control patterns, there are a plurality of groups of the second touch-control groups arranged in sequence in the first direction, and the first conductive connection portions of the adjacent second touch-control groups are connected with each other, wherein, the second touch-control branches close to each other between the adjacent second touch-control groups are located between the adjacent first touch-control groups, and one ends of the second touch-control branches that are close to each other between the adjacent second touch-control groups close to the first conductive connection portion are connected through a third conductive connection portion, to form a closed annular space.

In an exemplary embodiment of the present disclosure, a first dummy electrode insulated from the second touch-control electrode is provided in the closed annular space.

In an exemplary embodiment of the present disclosure, the touch-control unit has a first center line extending in the first direction and a second center line extending in a second direction, the second direction and the first direction are perpendicular to each other;

wherein, a plurality of the touch-control patterns are provided in the touch-control unit, and the touch-control units are arranged in a mirror image with respect to the first center line and/or the second center line.

In an exemplary embodiment of the present disclosure, four touch-control patterns are provided in the touch-control unit, and the four touch-control patterns are arranged in an array in the first direction and the second direction; adjacent touch-control patterns in the first direction share the first touch-control branch located at an edge, and the first touch-control branches located at the edge of the adjacent touch-control patterns in the second direction are directly connected; adjacent touch-control patterns in the second direction share the second conductive connection portion, and the second conductive connection portions between adjacent touch-control patterns in the first direction are connected through a conductive bridge, and the conductive bridge and the first touch-control electrode are insulated from each other;

wherein, the touch-control unit is arranged in a mirror image with respect to the first center line, and each touch-control pattern further includes a second dummy electrode insulated from the first touch-control electrode and the second touch-control electrode, and the second dummy electrode is located in an edge region of the touch-control pattern away from the second center line.

In an exemplary embodiment of the present disclosure, the plurality of touch-control units are arranged in an array in the first direction and the second direction, and the second conductive connection portions between the adjacent touch-control units in the first direction are connected to form an entire column of touch-control units, and the first conductive connection portions between the adjacent touch-control units in the second direction are connected to form an entire row of touch-control units;

wherein, the second conductive connection portions in the entire column of touch-control units are connected to a chip at least through a lead; the first conductive connection portions in the entire row of touch-control units are connected to the chip at least through a lead.

In an exemplary embodiment of the present disclosure, the chip is located at one end of the touch-control panel in the first direction, and the second conductive connection portion of a touch-control unit close to the chip in the entire column of touch-control units is connected to the chip through a lead, and the second conductive connection portion of a touch-control unit away from the chip in the entire column of touch-control units is connected to the chip through another lead.

In an exemplary embodiment of the present disclosure, the first touch-control electrode and the second touch-control electrode are both metal electrodes; wherein, orthographic projections of the first touch-control branch, the first conductive connection portion, the second touch-control branch and the second conductive connection portion on the substrate are all grid-shaped, and each grid is configured to correspond to one sub-pixel.

The present disclosure further provides a touch-control display apparatus, including a display panel and any of the touch-control panels described above, wherein the touch-control panel is located at a display side of the display panel.

BRIEF DESCRIPTION OF THE DRAWINGS

The drawings herein are incorporated into the specification and constitute a part of the specification, show embodiments in accordance with the disclosure, and explain the principle of the disclosure together with the specification. The drawings in the following description are only some embodiments of the present disclosure. For those of ordinary skill in the art, other drawings can be obtained based on these drawings without creative work.

FIG. 1 shows a schematic structural diagram of a touch-control unit according to the solution 1 in the related art;

FIG. 2 shows a schematic structural diagram of a touch-control unit according to the solution 2 in the related art;

FIG. 3 shows a touch-control effect diagram of the touch-control track when the touch-control unit in FIG. 1 or FIG. 2 is applied to an ultra-thin stack structure and the diameter of the copper pillar is 7 mm;

FIG. 2 is applied to an ultra-thin stack structure and the diameter of the copper pillar is 20 mm;

DETAILED DESCRIPTION

Figure 4:
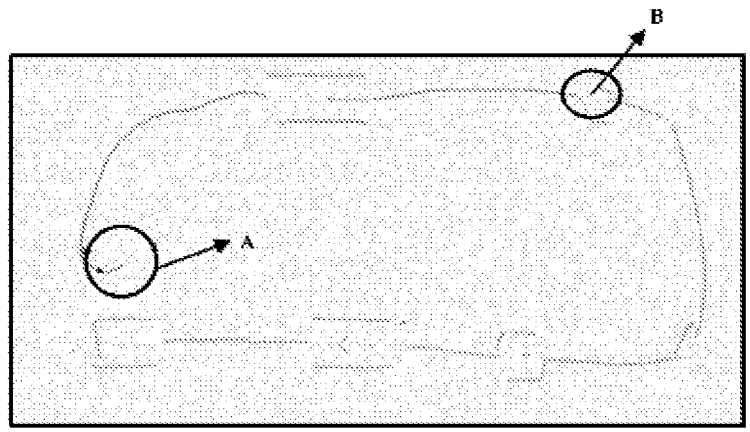
FIG. 4 shows a touch-control effect diagram of the touch-control track when the touch-control unit in FIG. 1

Example embodiments will now be described more fully with reference to the accompanying drawings. Example embodiments, however, can be embodied in various forms and should not be construed as limited to the embodiments set forth herein; rather, these embodiments are provided so that this disclosure will be thorough and complete, and will fully convey the concept of example embodiments to those skilled in the art. The same reference numerals in the drawings denote the same or similar structures, and thus their detailed descriptions will be omitted.

In addition, in the following detailed description, for the convenience of explanation, many specific details are set forth to provide a comprehensive understanding of the embodiments of the present disclosure. However, it is understood that one or more embodiments can also be implemented without these specific details.

It should be noted that the "on . . . ", "formed on . . . ", and "disposed on . . . " in this disclosure may mean that one layer is directly formed or disposed on another layer, or it can also mean that a layer is indirectly formed or disposed on another layer, that is, there are other layers between the two layers.

The terms "a", "an", "the", "said", and "at least one" are used to indicate the presence of one or more elements/components/etc.; the terms "including" and "having" are used to indicate open-ended inclusive meaning and means that there may be additional elements/components/etc. in addition to the listed elements/components/etc.

It should be noted that although the terms "first", "second", etc. may be used herein to describe various parts, components, elements, regions, layers and/or sections, these parts, components, elements, regions, layers and/or sections should not be limited by these terms. Rather, these terms are used to distinguish one part, member, element, region, layer, and/or section from another part, member, element, region, layer, and/or section.

In the present disclosure, unless otherwise specified, the adopted term "arranged in the same layer" means that two layers, parts, components, elements, or sections can be formed by the same patterning process, and the two layers, parts, components, elements or sections are generally formed of the same material.

In the present disclosure, unless otherwise specified, the expression "patterning process" generally includes steps of coating of the photoresist, exposure, development, etching, and stripping of the photoresist. The expression "one-time patterning process" means a process of forming patterned layers, parts, components, etc., using one mask.

In the related art, there are two touch-control units.

Solution 1: The first touch-control electrodes 101 and the second touch-control electrodes 102 in the touch-control unit 10 include a plurality of rectangular touch-control branches, and the touch-control branches of the first touch-control electrodes 101 and the second touch-control electrodes 102 intersect with each other, as shown in FIG. 1.

Solution 2: The first touch-control electrodes 201 and the second touch-control electrodes 202 in the touch-control unit 20 are rhombus-shaped, the first touch-control electrodes 201 are arranged in sequence in the row direction and are connected, and the second touch-control electrodes 202 are arranged in sequence in the column direction and are connected, as shown in FIG. 2. Specifically, FIG. 2 shows a schematic diagram of the mutual matching between parts of the two first touch-control electrodes 201 and parts of the two second touch-control electrodes 202.

When the inventors tested the touch-control performance of the touch-control units of the above two solutions, they found that, in the case of weak grounding, the maximum copper column diameter which can be supported by the same touch-control unit (for example, the touch-control unit 10 shown in FIG. 1 or the touch-control unit 20 shown in FIG. 2) under the ultra-thin stack structure (i.e., the thickness of the stack structure less than 200 μm) and under the conventional stack structure (i.e., the thickness of the stack structure greater than 500 μm) differ greatly. It should be noted that the thickness of the stack structure mentioned here refers to the distance between the copper pillars and the touch-control electrodes in the touch-control unit, and can also be understood as the distance between the touch-control electrodes and the top surface of the cover plate. The top surface is the surface that is in contact with the finger or copper pillar.

When the touch-control unit shown in FIG. 1 or FIG. 2 is applied to an ultra-thin stack structure, it cannot meet the touch-control requirement of the large-diameter copper pillar. In the LGM state, as the size of the copper pillar becomes larger, the R-transmission capacitance increases and the touch-control performance decreases. As shown in FIGS. 3 and 4, FIG. 3 shows a touch-control effect diagram of the touch-control track when the touch-control unit in FIG. 1 or FIG. 2 is applied to an ultra-thin stack structure and the diameter of the copper pillar is 7 mm. At this time, the touch-control sensitivity is good, and the touch-control effect is good. FIG. 4 shows a touch-control effect diagram of the touch-control track when the touch-control unit in FIG. 1 or FIG. 2 is applied to an ultra-thin stack structure and the diameter of the copper pillar is 20 mm. At this time, the touch-control sensitivity is poor, and touch-control problems such as jumping points, ghost points (such as A in FIG. 4), and disconnection (such as B in FIG. 4) are prone to occur, that is, the touch-control effect is poor. Since the width of a human thumb is usually about 20 mm, the touch-control units mentioned in the above two solutions cannot meet the touch-control requirement of the thumb in normal conditions under the condition of ultra-thin stack structure and weak grounding.

Figure 5:
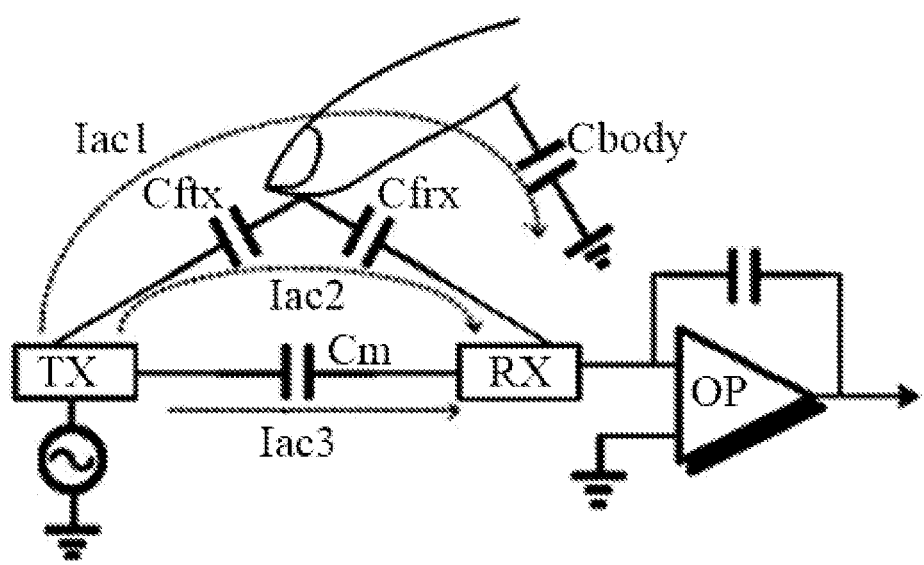
FIG. 5 shows a schematic diagram of the R-transmission mechanism of the touch-control unit in the LGM state.

FIG. 5 shows the R-transmission mechanism of the touch-control unit in the LGM state. In FIG. 5, Iac1 is the current branch from the TX (transmitting) electrode to the human body through the finger; Iac2 is the current branch added between the TX electrode and the RX (receiving) electrode during the touch-control, which will increase the capacitance between TX and RX. The increased capacitance is the capacitance Cftx between the finger and the TX electrode and the capacitance Cfrx between the finger and the RX electrode. Iac3 is the AC current branch between the TX electrode and the RX electrode. The capacitance of this branch is Cm, during the touch-control, the capacitance Cm of this branch will decrease due to the touch of a finger. When a large-area touch-control occurs, the capacitance Cftx between the finger and the TX electrode and the capacitance Cfrx between the finger and the RX electrode will increase, so that the increase of Iac2 is greater than the decrease of Iac3, resulting in the decrease or even zero of the overall mutual capacitance change ΔCm of the touch-control system. The chip (IC) is difficult to detect the change in the mutual capacitance of the touch-control points, resulting in poor touch-control accuracy.

In addition, it should be noted that Cbody in FIG. 5 refers to the capacitance of the human body, and OP refers to an operational amplifier.

Figure 6:
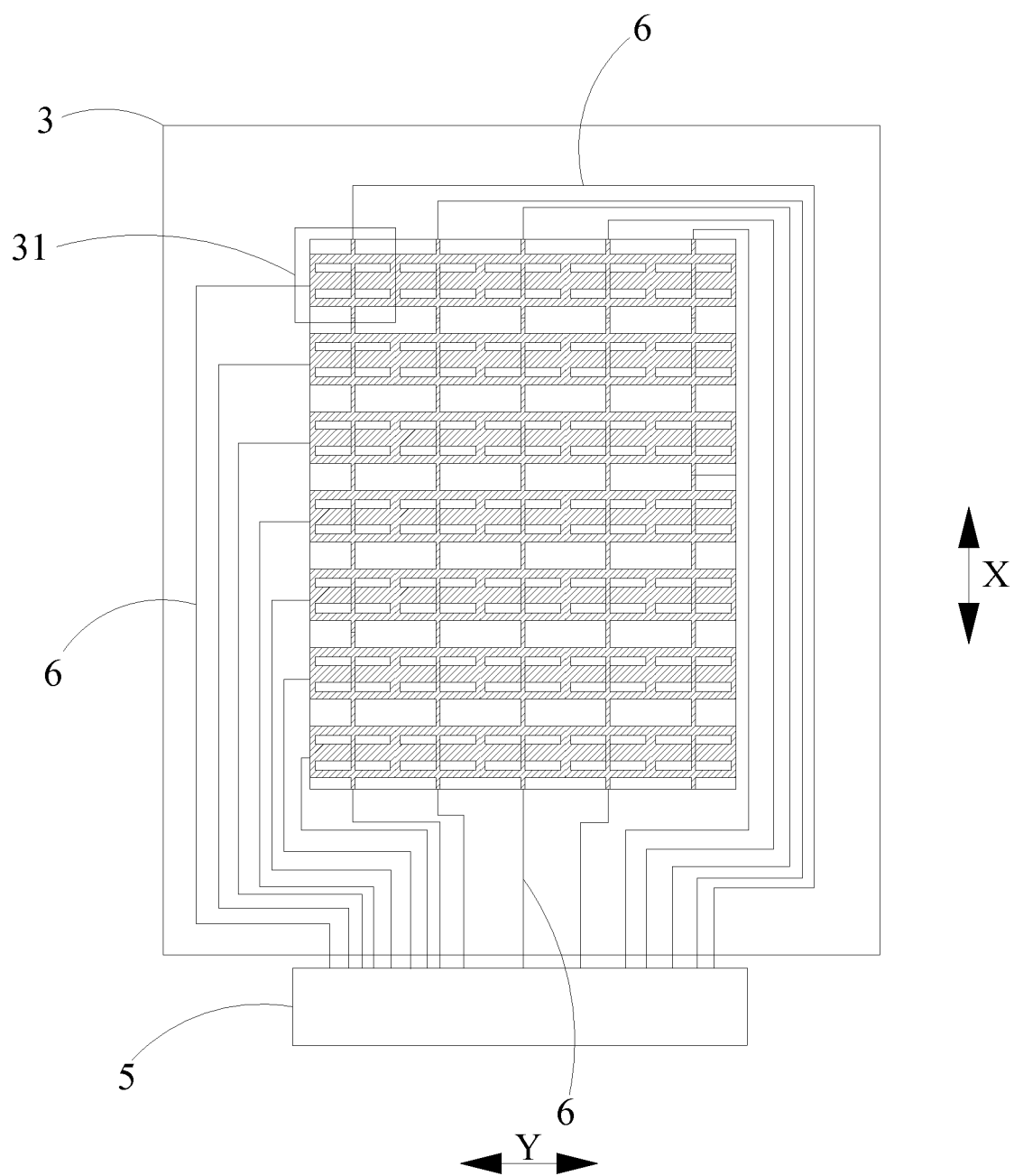
FIG. 6 is a schematic diagram illustrating the assembly of a touch-control panel and a chip according to an embodiment of the present disclosure.
Figure 11:
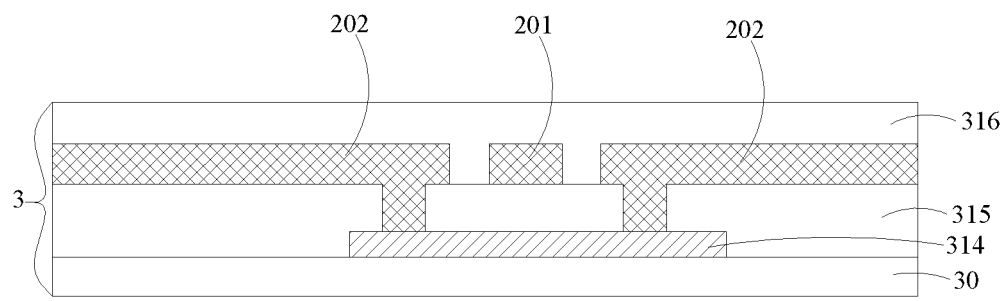
FIG. 11 shows a partial cross-sectional view of the touch-control panel according to an embodiment of the present disclosure.

In order to solve the above problems, as shown in FIG. 6 and FIG. 11, the inventor has further designed a touch-control panel 3. The touch-control panel 3 may include a substrate 30 and a touch-control sensing layer on the substrate 30. The substrate 30 can be a single-layer or multi-layer structure. The substrate 30 can be made of transparent inorganic materials or organic materials. The touch-control sensing layer can be a multi-layer structure, which can include a conductive pattern layer and an insulating layer. The conductive pattern layer can be made of metal materials to ensure its conductive effect. The insulating layer can be made of transparent inorganic materials or organic materials.

Figure 7:
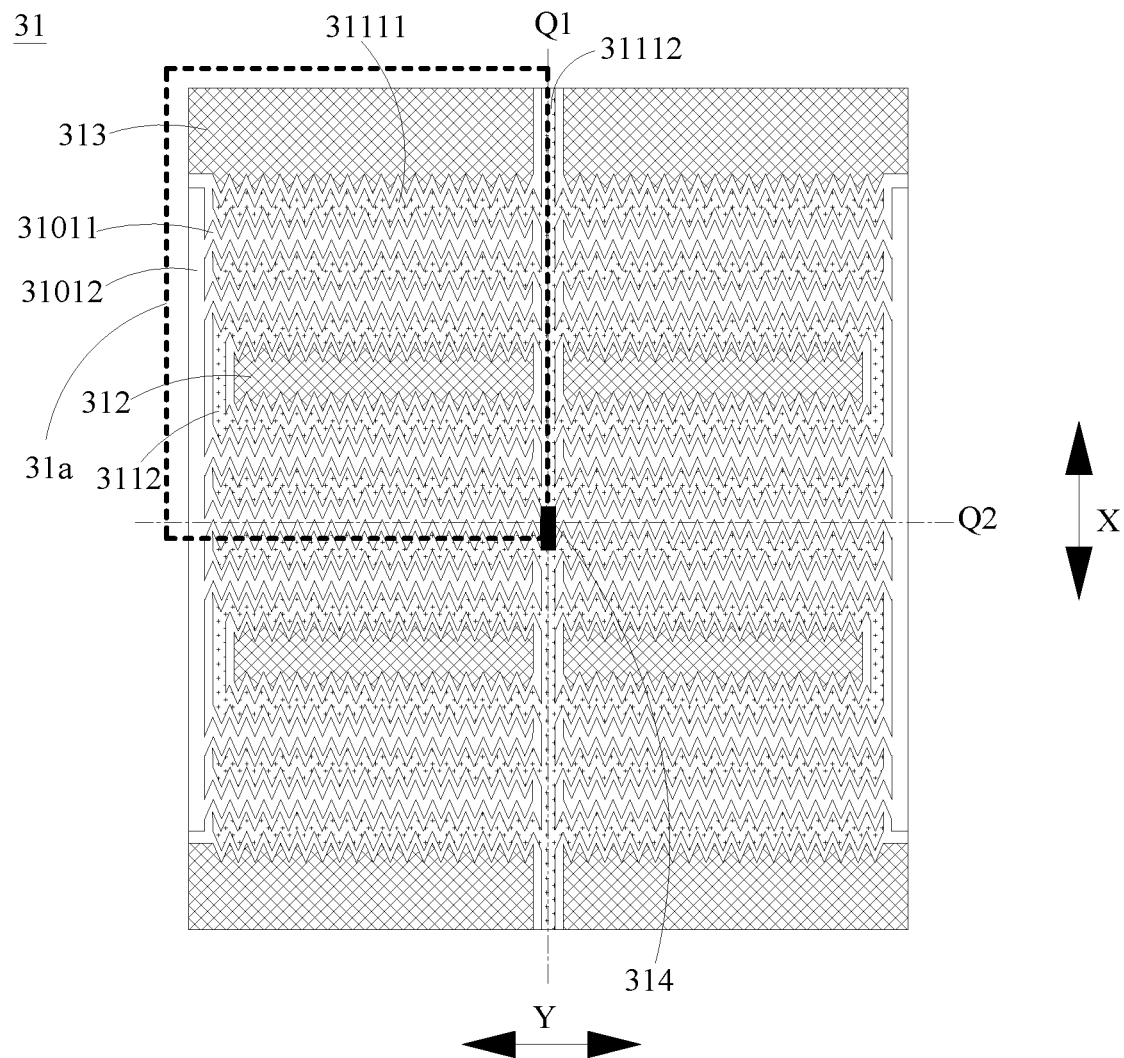
FIG. 7 shows a schematic structural diagram of the touch-control unit shown in FIG. 6.
Figure 8:
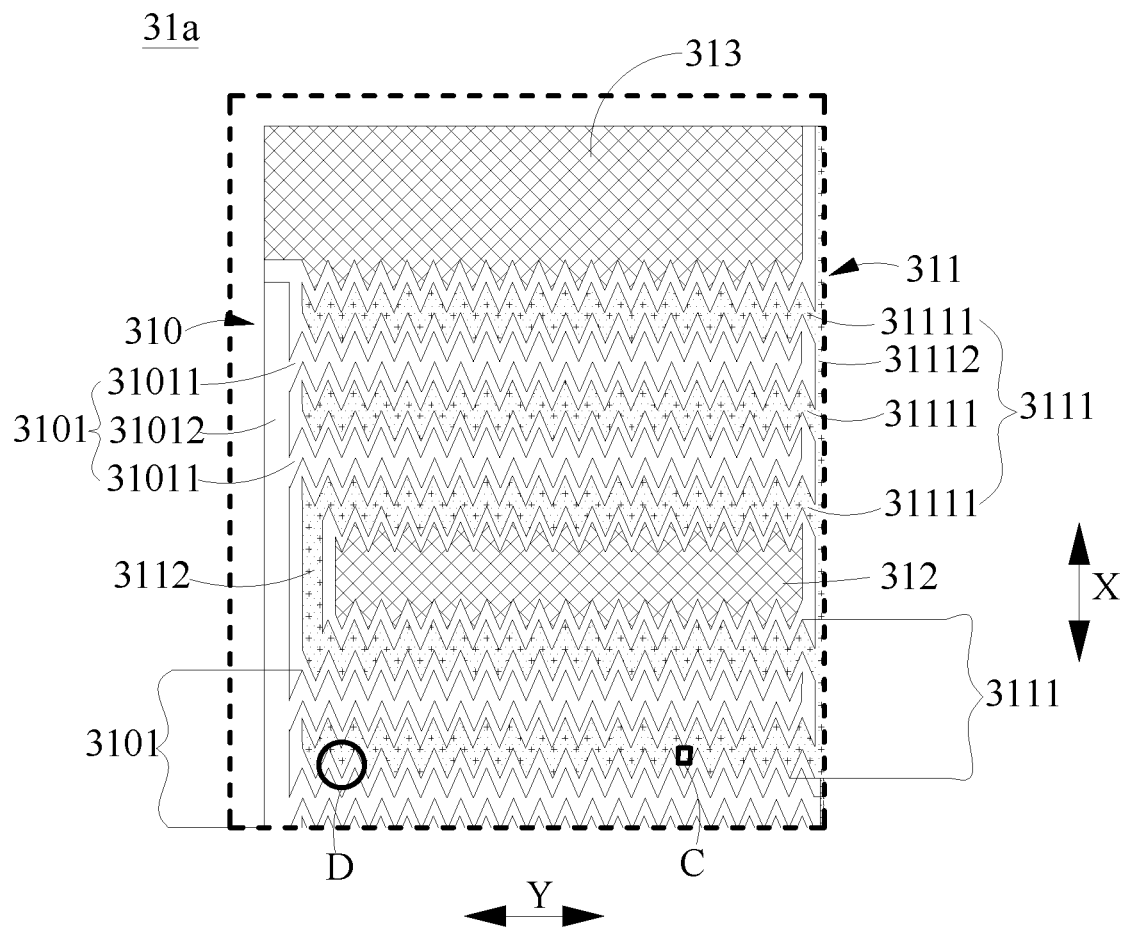
FIG. 8 shows a schematic structural diagram of the touch-control pattern shown in FIG. 7.

In detail, as shown in FIG. 6 to FIG. 8, the touch-control sensing layer may include a plurality of touch-control units 31. Each of the touch-control units 31 may include at least one touch-control pattern 31*a*. The touch-control pattern 31*a* includes a first touch-control electrode 310 and a second touch-control electrode 311 that are insulated from each other. The first touch-control electrode 310 and the second touch-control electrode 311 can be located in the same conductive pattern layer. In order to realize the insulation of the first touch-control electrode 310 and the second touch-control electrode 311, each part of the first touch-control electrode 310 and the second touch-control electrode 311 needs to be spaced apart from each other. It should be understood that the first touch-control electrode 310 may be one of the receiving (RX) electrode and the transmitting (TX) electrode; and the second touch-control electrode 311 may be the other of the (RX) electrode and the transmitting (TX) electrode.

As shown in FIG. 8, the first touch-control electrode 310 of each touch-control pattern 31a has at least one group of first touch-control group 3101. The first touch-control group 3101 includes a plurality of first touch-control branches 31011 and first conductive connection portions 31012 connected to one end of the plurality of first touch-control branches 31011. The second touch-control electrode 311 has at least one group of second touch-control group 3111. The second touch-control group 3111 includes a plurality of second touch-control branches 1111 and second conductive connection portions 31112 connected to one end of the plurality of second touch-control branches 31111. It should be understood that the first conductive connection portions 31012 in the first touch-control group 3101 are located on a side of the plurality of first touch-control branches 31011 away from the second conductive connection portions 31112 and are spaced apart from the end of each second touch-control branch 31111. The second conductive connection portions 31112 in the second touch-control group 3111 are located on a side of the plurality of second touch-control branches 31111 away from the first conductive connecting portion 31012 and are spaced apart from the end of each first touch-control branch 31011. In the embodiment, the second touch-control branch 31111 of the second touch-control group 3111 in each touch-control pattern 31a and the first touch-control branch 31011 of the first touch-control group 3101 are alternately arranged in the first direction X and are spaced apart from each other. That is, the first touch-control electrodes 310 and the second touch-control electrodes 311 are arranged to intersect with each other.

In addition, as shown in FIG. 8, in the embodiment of the present disclosure, surfaces of the first touch-control branches 31011 opposite to the second touch-control branches 31111 are wave-shaped surfaces; and/or surfaces of the second touch-control branches 31111 opposite to the first touch-control branches 31011 are wave-shaped surfaces. In this way, the length of the channel formed between the first touch-control branch 31011 and the second touch-control branch 31111 can be increased, thereby increasing the fringe field between the first touch-control branch 31011 and the second touch-control branch 31111, and then increasing the basic mutual capacitance value in the touch-control panel 3 and the amount of mutual capacitance change between the TX electrode and the RX electrode when touch-control occurs, so that the touch-control panel 3 has good sensitivity, noise ratio and floating performance (LGM), i.e., the touch-control sensitivity and touch-control performance in the LGM state are improved.

In addition, by setting surfaces of the first touch-control branches 31011 opposite to the second touch-control branches 31111 as wave-shaped surfaces; and/or surfaces of the second touch-control branches 31111 opposite to the first touch-control branches 31011 as wave-shaped surfaces, when the touch-control unit 31 is applied to a display product, compared with the touch-control unit 10 of the solution 1 in the related art, the problem of uneven light reflection due to uneven cutting density can be improved, thereby improving the display effect.

Figure 9:
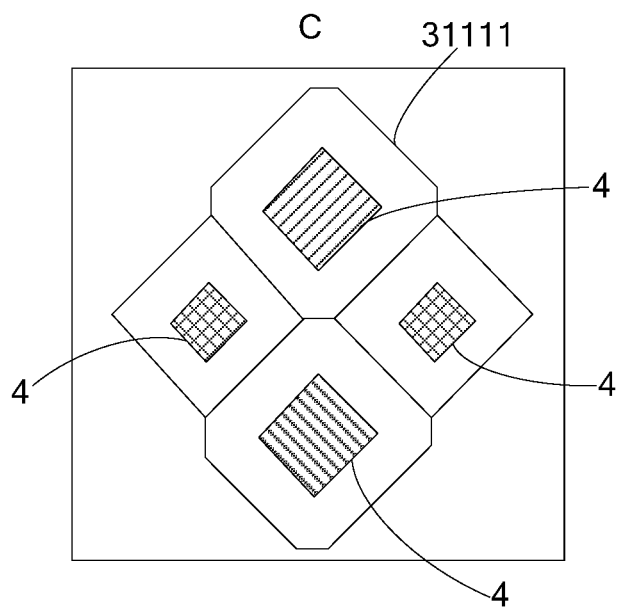
FIG. 9 is a schematic diagram illustrating the cooperation of the sub-pixels and the C-section structure in the touch-control pattern shown in FIG. 8.

For example, the first touch-control electrode 310 and the second touch-control electrode 311 are both metal electrodes, that is, they can be made of metal materials, such as copper, silver, and other materials, so as to improve the conductive effects of the first touch-control electrode 310 and the second touch-control electrode 311. The orthographic projections of the first touch-control branch 31011, the first conductive connection portion 31012, the second touch-control branch 31111 and the second conductive connection portion 31112 on the substrate 30 are all grid-shaped. That is to say, the first touch-control branch 31011, the first conductive connection portion 31012, the second touch-control branch 31111, and the second conductive connection portion 31112 can be metal grid structures. Further, the first touch-control electrode 310 and the second touch-control electrode 311 are metal grid structures. Each grid is configured to correspond to a sub-pixel 4, as shown in FIG. 9. That is, the orthographic projection of each sub-pixel 4 on the substrate 30 is located in a metal grid. The colors of the sub-pixels 4 corresponding to different metal grids may be the same or different. In addition, the metal grid can be rectangular, rhombic, but not limited thereto, and can also be triangular, pentagonal, hexagonal, and the like.

In some embodiments, as shown in FIG. 8, opposite sides of the first touch-control branches 31011 of the first touch-control electrodes 310 in the touch-control pattern 31a in the first direction X are both wave-shaped surfaces, so as to further increase the basic mutual capacitance value in the touch-control panel 3 and the mutual capacitance change between the TX electrode and the RX electrode when the touch-control occurs.

In some embodiments, as shown in FIG. 8, opposite sides of the second touch-control branches 31111 of the second touch-control electrodes 311 in the touch-control pattern 31a in the first direction X are both wave-shaped surfaces, so as to further increase the basic mutual capacitance value in the touch-control panel 3 and the mutual capacitance change between the TX electrode and the RX electrode when the touch-control occurs.

In some embodiments, as shown in FIG. 8, opposite sides of the first touch-control branches 31011 of the first touch-control electrodes 310 in the touch-control pattern 31a in the first direction X are both wave-shaped surfaces, and opposite sides of the second touch-control branches 31111 of the second touch-control electrodes 311 in the touch-control pattern 31a in the first direction X are both wave-shaped surfaces, so as to further increase the basic mutual capacitance value in the touch-control panel and the mutual capacitance change between the TX electrode and the RX electrode when the touch-control occurs.

It should be understood that the wave-shaped surface is formed by splicing a plurality of tooth portions arranged in a second direction Y, as shown in FIG. 8, and the second direction Y intersects with the first direction X. Optionally, the second direction Y is perpendicular to the first direction X.

As shown in FIG. 8, when the opposite sides of the first touch-control branch 31011 and the second touch-control branch 31111 in the first direction X are both wave-shaped surfaces, tooth portions of the adjacent first touch-control branch 31011 and second touch-control branch 31111 are engaged with each other. In this way, the first touch-control electrodes 310 and the second touch-control electrodes 311 can be arranged more closely, thereby increasing the number of the first touch-control electrodes 310 and the second touch-control electrodes 311 in a unit area, and then improving the touch-control precision and sensitivity of the touch-control panel 3.

It should be understood that tooth portions of the adjacent first touch-control branch 31011 and second touch-control branch 31111 can also be designed to be in a non-engaged state, which depends on the specific situation.

Optionally, sizes and shapes of the tooth portions of the first touch-control branch may be identical with sizes and shapes of the tooth portions of the second touch-control branch 31111.

Optionally, as shown in FIG. 8, tooth portions on opposite sides of the first touch-control branch 31011 in the first direction X may be arranged in a staggered manner, such design can make the width (this width refers to the size in the first direction X) of each part of the first touch-control branch 31011 substantially equal, so that the uniformity of the performance of each part of the first touch-control branch 31011 can be ensured. Similarly, tooth portions on opposite sides of the second touch-control branch 31111 in the first direction X may be arranged in a staggered manner. But it is not limited to this, and tooth portions on opposite sides of the first touch-control branch 31011 and second touch-control branch 31111 in the first direction X can also be symmetrically arranged, depending on the specific situation.

In some embodiments, the distance between the adjacent first touch-control branch 31011 and the second touch-control branch 31111 in the first direction X may be 1 μm to 10 μm, such as 1 μm, 3 μm, 5 μm, 7 μm, 10 μm, etc., but It is not limited to this, and may be larger than 10 μm, depending on the specific situation. In the embodiment of the present disclosure, the distance between the adjacent first touch-control branch 31011 and the second touch-control branch 31111 in the first direction X may be 5 μm, so as to increase the basic mutual capacitance value in the touch-control panel 3 and the change in mutual capacitance between the TX electrode and the RX electrode during the touch-control and meanwhile reduce the difficulty of processing. It should be noted that the distance between the adjacent first touch-control branch 31011 and the second touch-control branch 31111 in the first direction X is not limited to the above-mentioned values, and may also be other values, depending on the specific situation.

In some embodiments, each part in a channel formed between the first touch-control branch 31011 and second touch-control branch 31111 has an identical size in the first direction X, so as to ensure the uniformity of the fringe electric field of each part, and then ensure touch-control sensitivity and touch-control precision of each part.

Figure 10:
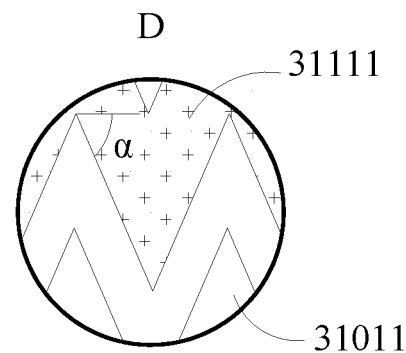
FIG. 10 shows an enlarged schematic structural diagram of the D part shown in FIG. 8.

In some embodiments, the tooth portion of the wave-shaped surface may be triangular, arc or trapezoid, but not limited thereto, and may also be other shapes. As shown in FIGS. 8 and 10, when the tooth portion is a triangle, the included angle α between the side surface of the tooth portion and the plane where the first direction X is located is 5° to 95°, for example, 5°, 30°, 45°, 60°, 95°, etc. Optionally, the included angle α between the side surface of the tooth portion and the plane where the first direction X is located can be 45°, such design increases the length of the channel between the first touch-control branch 31011 and the second touch-control branch 31111, and meanwhile balance the widths of the first touch-control branch 31011 and the second touch-control branch 31111, so as to avoid the situation where the widths are too large and affect the touch-control performance.

In some embodiments, as shown in FIG. 8, the first touch-control groups 3101 in the first touch-control electrodes 310 of each touch-control pattern 31a may be provided in multiple groups, and arranged in sequence in the first direction X, and the first conductive connection portions 31012 of the adjacent first touch-control groups 3101 are connected. The second touch-control groups 3111 in the second touch-control electrodes 311 of each touch-control pattern 31a are provided in multiple groups, and are arranged in sequence in the first direction X, and the first conductive connection portions 31012 of adjacent second touch-control groups 3111 are connected. In the embodiment, the second touch-control branches 31111 close to each other between the adjacent second touch-control groups 3111 are located between the adjacent first touch-control groups 3101, and one ends of the second touch-control branches 31111 that are close to each other between the adjacent second touch-control groups 3111 close to the first conductive connection portion 31012 are connected through a third conductive connection portion 3112, to form a closed annular space. That is, the adjacent second touch-control groups 3111 in the second touch-control electrodes 311 are connected in a ring shape, and this design can reduce the channel impedance of the second touch-control electrode 311. It should be understood that the third conductive connection portion 3112 may be a part of the second touch-control electrode 311, and the third conductive connection portion 3112 may be a metal grid structure, and each metal grid corresponds to a sub-pixel.

It should be noted that the two surfaces of the first conductive connection portion 31012, the second conductive connection portion 31112, and the third conductive connection portion 3112 in the second direction Y may be flat surfaces or the aforementioned wave-shaped surfaces, depending on the specific situation.

In the embodiment of the present disclosure, as shown in FIG. 8, the first touch-control electrodes 310 of each touch-control pattern 31a may include two groups of first touch-control groups 3101. The second touch-control electrodes 311 of each touch-control pattern 31a can include two groups of second touch-control groups 3111. Each second touch-control group 3111 can intersect with a first touch-control group 3101, to form a touch-control electrode group, but not limited to this. Each touch-control electrode may be provided with more touch-control groups, and the second touch-control group 3111 and the first touch-control group 3101 are not limited to one-to-one, but can also be one-to-many, depending on the specific situation.

It should be noted that, the number of the first touch-control branches 31011 in each of the first touch-control groups 3101 may be the same or different, depending on the specific situation. Similarly, the number of the second touch-control branches 31111 in each of the second touch-control groups 3111 may be the same or different, depending on the specific situation.

In some embodiments, as shown in FIG. 8, the closed annular space of each touch-control pattern 31a may be provided with a first dummy electrode 312 insulated from the second touch-control electrode 311. Specifically, there are gaps between the first dummy electrode 312 and the second touch-control branch 31111, the second conductive connection portion 31112 and the third conductive connection portion 3112, so as to achieve mutual isolation between the first dummy electrode 312 and the second touch-control electrode 311. It should be noted that the first dummy electrode 312 refers to an electrode that is not driven and is not used for sensing, such as a TX electrode, not used for sensing. The first dummy electrode 312 can be grounded, floating (not connected to a specific voltage potential) or a combination of them two. In the embodiment of the present disclosure, the optical characteristics of the touch-control panel 3 can be controlled by arranging the first dummy electrodes 312; and by arranging the first dummy electrodes 312 in the closed annular space of the touch-control pattern 31a, the first dummy electrodes 312 and the first touch-control group 3101/the second touch-control group 3111 are arranged at intervals and dispersedly, so as to improve the linearity and precision of touch-control performance.

For example, the first dummy electrode 312 can be a metal grid structure, and each metal grid corresponds to a sub-pixel 4. The first dummy electrode 312 can be disposed in the same layer as the first touch-control electrode 310 and the second touch-control electrode 311.

In some embodiments, as shown in FIG. 7, there may be a plurality of touch-control patterns 31a in each touch-control unit 31, and the plurality of touch-control patterns 31a may be arranged according to a certain rule. Specifically, the touch-control unit 31 has a first center line Q1 extending in the first direction X and a second center line Q2 extending in the second direction Y. The second direction Y and the first direction X are perpendicular to each other, and the touch-control unit 31 is arranged in a mirror image with respect to the first center line Q1 and/or the second center line Q2. That is to say, the touch-control patterns 31a in each touch-control unit 31 can be arranged according to a certain rule, so that the final formed touch-control unit 31 may be arranged in a mirror image with respect to the first centerline Q1 and/or the second centerline Q2.

In an embodiment of the present disclosure, as shown in FIG. 7, there may be four touch-control patterns 31a in the touch-control unit 31, and the four touch-control patterns 31a are arranged in an array in the first direction X and the second direction Y. The touch-control unit 31 is arranged in a mirror image with respect to the first center line. Specifically, adjacent touch-control patterns 31a in the first direction X may share the first touch-control branch 31011 located at an edge, and the first touch-control branches 31011 located at the edge of the adjacent touch-control patterns 31a in the second direction Y are directly connected. The adjacent touch-control patterns 31a in the second direction Y share the second conductive connection portion 31112, and the second conductive connection portions 31112 between adjacent touch-control patterns 31a in the first direction X are connected through a conductive bridge 314. That is, the adjacent second touch-control electrodes 311 are connected by the conductive bridge 314. The conductive bridge 314 and the first touch-control electrode 310 are insulated from each other.

Figure 12:
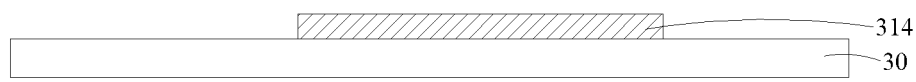
FIG. 12 shows a schematic structural diagram of completing step S1.
Figure 13:
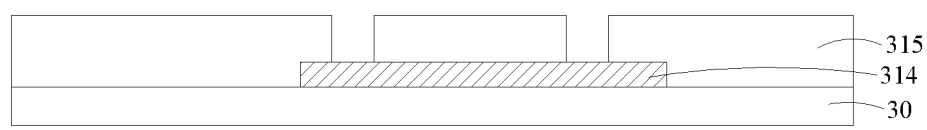
FIG. 13 shows the structural schematic diagram of completing step S2.
Figure 14:
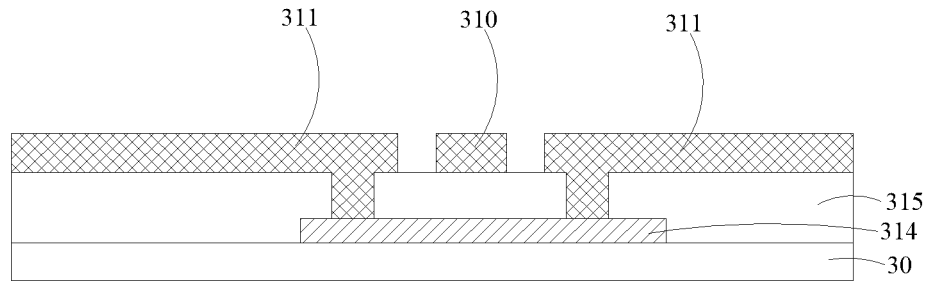
FIG. 14 shows the structural schematic diagram of completing step S3.

It should be understood that the following steps may be included when the above-mentioned touch-control unit 31 is fabricated. Step S1, a first conductive pattern layer may be formed on the substrate 30 firstly. As shown in FIG. 12, the first conductive pattern layer includes a conductive bridge 314, and the process that can be adopted includes cleaning the photoresist, exposing, developing, etching, peeling, and cleaning. Step S2, a first insulating layer 315 is formed on the first conductive pattern layer, as shown in FIG. 13, the process of coating the photoresist, exposing, and developing. Step S3, after the first insulating layer 315 is fabricated, a second conductive pattern layer is fabricated. As shown in FIG. 14, the second conductive pattern layer may include the first touch-control electrodes 310, the second touch-control electrode 311, and the process of sputtering, cleaning the photoresist, exposure, development, etching, stripping, and cleaning may adopt. The second conductive connection portions 31112 between the adjacent touch-control patterns 31a in the first direction X can be respectively connected to the conductive bridge 314 through a via hole on the first insulating layer 315. Step S4, the second insulating layer 316 is finally formed on the uppermost part, as shown in FIG. 7 and FIG. 11.

As shown in FIGS. 7 and 8, each touch-control pattern 31a in the aforementioned touch-control unit 31 further includes a second dummy electrode 313 insulated from the first touch-control electrode 310 and the second touch-control electrode 311. That is, a second dummy electrode 313 is arranged at intervals with the touch-control electrode 310 and a second touch-control electrode 311 to achieve mutual insulation. The second dummy electrode 313 and the first dummy electrode 312 can be arranged in the same layer.

As shown in FIG. 7 and FIG. 8, the second dummy electrode 313 is located in the edge region of the touch-control pattern 31a away from the second center line Q2. It should be noted that the second dummy electrode 313 refers to an electrode that is not driven and is not used for sensing, such as a TX electrode, not used for sensing. The second dummy electrode 313 can be grounded, floating (not connected to a specific voltage potential) or a combination of them two. In the embodiment of the present disclosure, by disposing the second dummy electrodes 313, the optical properties of the touch-control panel 3 can be controlled; and it makes that the first touch-control electrodes 310/the second touch-control electrodes 311 in the adjacent touch-control units 31 arranged at intervals and dispersedly, so that the linearity and precision of the touch-control performance can be improved.

It should be understood that the number of touch-control patterns 31a in the touch-control unit 31 is not limited to four, and may also be set to one, two, six, eight, etc., depending on the specific situation. In addition, the touch-control pattern 31a in the touch-control unit 31 is not limited to the form described in the above embodiment, and can also be in other forms, as long as it can ensure that the touch-control panel 3 can improve the touch-control performance in the LGM state and the touch-control sensitivity under the ultra-thin stack structure.

In the embodiment of the present disclosure, the sizes of the first touch-control branches 31011 of the first touch-control electrodes 310 and the second touch-control branches 31111 of the second touch-control electrodes 311 in the touch-control pattern 31a in the second direction Y may be $1/40$ to $1/2$ of the size of the touch-control unit 31 in the second direction Y. The sizes of the first touch-control branches 31011 of the first touch-control electrodes 310 and the second touch-control branches 31111 of the second touch-control electrodes 311 in the touch-control pattern 31a in the first direction X can be $1/100$ to $1/4$ of the size of the touch-control unit 31 in the first direction X.

In some embodiments, as shown in FIG. 6, a plurality of touch-control units 31 are arranged in an array in the first direction X and the second direction Y, and the second conductive connection portions 31112 between the adjacent touch-control units 31 in the first direction X are connected to form an entire column of touch-control units, and the first conductive connection portions 31012 between the adjacent touch-control units 31 in the second direction Y are connected to form an entire row of touch-control units, so that the number of channels can be appropriately reduced.

As shown in FIG. 6, the second conductive connection portions 31112 in the entire column of touch-control units are connected to a chip 5 at least through a lead 6. The first conductive connection portions 31012 in the entire row of touch-control units are connected to the chip 5 at least through a lead 6. Optionally, as shown in FIG. 6, the chip 5 is located at one end of the touch-control panel 3 in the first direction X, and the second conductive connection portion 31112 of a touch-control unit 31 close to the chip 5 in the entire column of touch-control units is connected to the chip 5 through a lead 6, and the second conductive connection portion 31112 of a touch-control unit 31 away from the chip 5 is connected to the chip 5 through another lead 6, such design can avoid excessive signal attenuation of the touch-control unit 31 away from the chip 5, and the touch-control sensitivity and accuracy of the touch-control panel 3 can be improved.

The following describes the touch-control performance of the touch-control unit according to a specific embodiment of the present disclosure and the touch-control unit in the related art when applied to an ultra-thin stack structure and in an LGM state with reference to the diagrams.

As shown in Table 1 below, Table 1 shows the simulation results of the touch-control unit 31 in the embodiment of the present disclosure (shown in FIG. 7) and the touch-control unit 10 of the related technical solution 1 (shown in FIG. 1).

TABLE 1

| touch-control unit | related art solution 1 | solution in the embodiment of the present disclosure |
|---|---|---|
| stacked thickness (μm) | 177 | 177 |
| Cm (pF) | 0.757 | 0.953 |
| ΔCm (pF) | 0.061 | 0.118 |
| ΔCm/Cm | 8.10% | 12.40% |
| Rtx (ohm) | 43.8 | 49.2 |
| Rrx (ohm) | 43.1 | 43.4 |

It should be noted that in Table 1, the overall size of the touch-control unit 31 in the embodiment of the present disclosure (as shown in FIG. 7) and the touch-control unit 10 of the solution 1 in the related art (as shown in FIG. 1) are both 4.2 mm×4.2 mm, and the line width of the metal grid is 3 μm.

Based on the above Table 1, it can be seen that when the touch-control unit 31 in the embodiment of the present disclosure is applied to a stack structure with a thickness of 177 μm and is in the LGM state, the basic mutual capacitance value Cm between the TX electrode and the RX electrode is 0.953 pF, and the mutual capacitance change ΔCm between the TX electrode and the RX electrode when the touch-control occurs is 0.118 pF; the ratio between ΔCm and Cm is 12.40%; the resistance Rtx of the TX electrode is 49.2 ohm; the resistance Rrx of the RX electrode is 43.4 ohm. When the touch-control unit 10 of the related art solution 1 is applied to a stack structure with a thickness of 177 μm and is in the LGM state, the basic mutual capacitance value Cm between the TX electrode and the RX electrode is 0.757 pF, and the mutual capacitance change ΔCm between the TX electrode and the RX electrode when the touch-control occurs is 0.061 pF; the ratio between ΔCm and Cm is 8.10%; the resistance Rtx of the TX electrode is 48.8 ohm; the resistance Rrx of the RX electrode is 43.1 ohm. By comparison, compared with the touch-control unit 10 of the related technical solution 1, the touch-control unit 31 of the embodiment of the present disclosure has an increase of 25.8% in Cm, an increase of 93.4% in ΔCm, and an increase of 4.3% in ΔCm/Cm. Therefore, it can be seen that the touch-control unit 31 of the embodiment of the present disclosure greatly increases the mutual capacitance change (ΔCm) and the basic mutual capacitance value (Cm) during touch-control, and improves the touch-control performance in the LGM state.

As shown in Table 2 below, Table 2 shows the simulation results of the touch-control unit 31 in the embodiment of the present disclosure (shown in FIG. 7) and the touch-control unit 20 of the related technical solution 2 (shown in FIG. 2).

TABLE 2

| touch-control unit | related art solution 2 | solution in the embodiment of the present disclosure |
|---|---|---|
| stacked thickness (μm) | 170 | 170 |
| Cm (pF) | 0.511 | 0.953 |
| ΔCm (pF) | 0.085 | 0.118 |
| ΔCm/Cm | 16.6% | 12.40% |
| Rtx (ohm) | 37 | 49.2 |
| Rrx (ohm) | 38.8 | 43.4 |
| Cftx (pF) | 0.561 | 0.601 |
| Cfrx (pF) | 0.538 | 0.386 |

It should be noted that in Table 2, the overall size of the touch-control unit 31 in the embodiment of the present disclosure (as shown in FIG. 7) and the touch-control unit 20 of the solution 2 in the related art (as shown in FIG. 2) are both 4.2 mm×4.2 mm, and the line width of the metal grid is 3 μm.

Based on the above Table 2, it can be seen that when the touch-control unit 31 in the embodiment of the present disclosure is applied to a stack structure with a thickness of 170 μm and is in the LGM state, the basic mutual capacitance value Cm between the TX electrode and the RX electrode is 0.953 pF, and the mutual capacitance change ΔCm between the TX electrode and the RX electrode when the touch-control occurs is 0.118 pF; the ratio between ΔCm and Cm is 12.40%; the resistance Rtx of the TX electrode is 49.2 ohm; the resistance Rrx of the RX electrode is 43.4 ohm; the capacitance Cftx between the TX electrode and the finger is 0.601 pF, and the capacitance Cfrx between the RX electrode and the finger is 0.386 pF. When the touch-control unit 20 of the related art solution 2 is applied to a stack structure with a thickness of 170 μm and is in the LGM state, the basic mutual capacitance value Cm between the TX electrode and the RX electrode is 0.511 pF, and the mutual capacitance change ΔCm between the TX electrode and the RX electrode when the touch-control occurs is 0.085 pF; the ratio between ΔCm and Cm is 16.6%; the resistance Rtx of the TX electrode is 37 ohm; the resistance Rrx of the RX electrode is 38.8 ohm; Cftx is 0.561 pF, Cfrx is 0.538 pF. By comparison, compared with the touch-control unit 20 of the related technical solution 2, the touch-control unit 31 of the embodiment of the present disclosure has an increase of 86.5% in Cm, an increase of 38.8% in ΔCm, and although its ΔCm/Cm is lower than the related technical solution 2, the Cfrx in the solution of the embodiment of the present disclosure is much smaller than that in the related technical solution 2. Therefore, it can be seen that the touch-control unit 31 of the embodiment of the present disclosure greatly increases the mutual capacitance change (ΔCm) and the basic mutual capacitance value (Cm) during the touch-control, and improves the touch-control performance in the LGM state.

Figure 15:
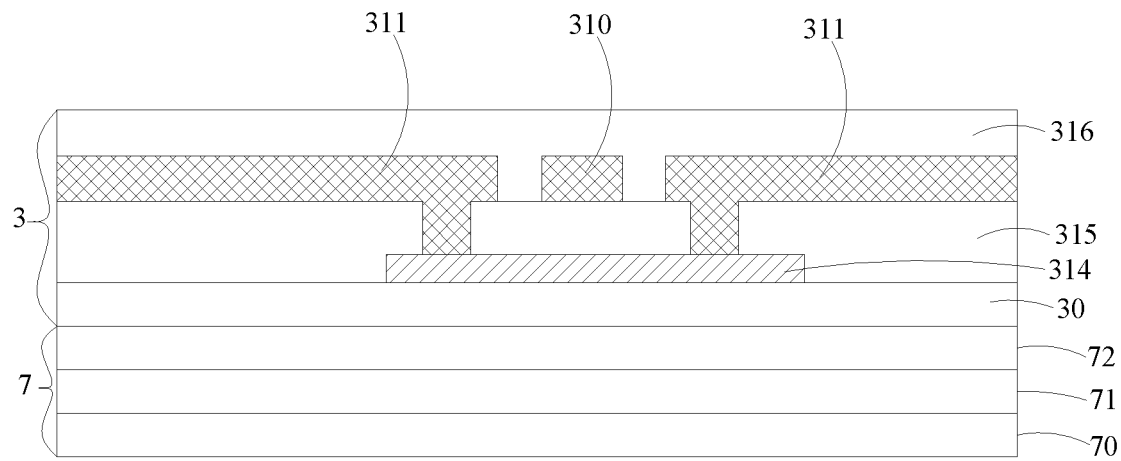
FIG. 15 is a schematic structural diagram of a touch-control display apparatus according to an embodiment of the present disclosure.

An embodiment of the present disclosure further provides a touch-control display apparatus, as shown in FIG. 15, which includes a display panel 7 and the touch-control panel 3 described in any of the above embodiments, the touch-control panel 3 is located at a display side of the display panel.

Figure 16:
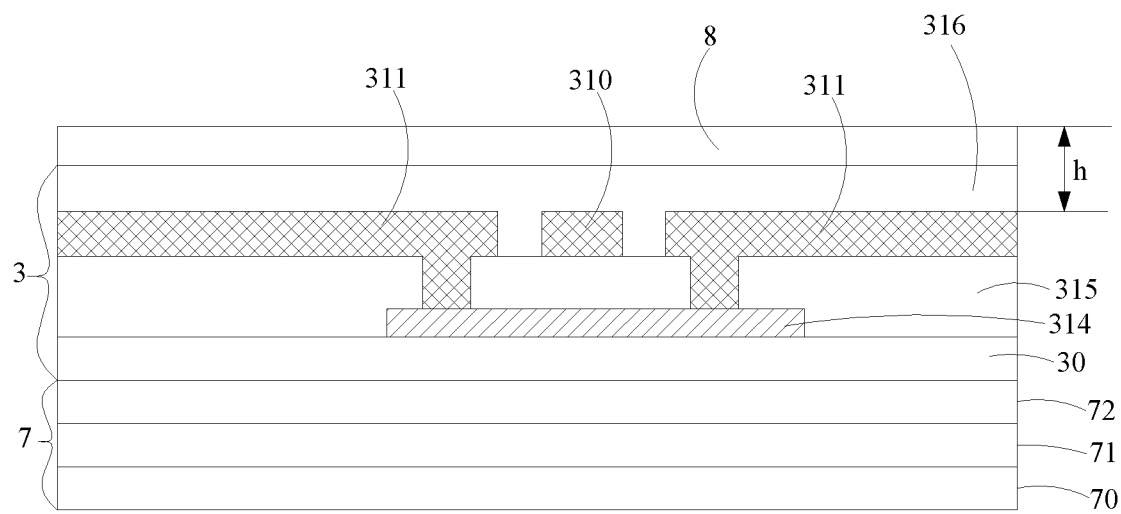
FIG. 16 is a schematic structural diagram of a touch-control display apparatus according to another embodiment of the present disclosure.

In the embodiment of the present disclosure, as shown in FIG. 15 and FIG. 16, the display panel 7 may be an OLED (Organic Light-Emitting Diode) display. Specifically, the display panel 7 may include a substrate 70, an organic light-emitting functional layer 71 formed on the substrate 70, and an encapsulation film 72 covering the organic light-emitting functional layer 71. It should be understood that the substrate 70 may be a multi-layer or single-layer structure, and may be made of one of inorganic insulating materials and organic insulating materials. The organic light-emitting functional layer 71 may include a driving transistor and an organic light-emitting device connected to the driving transistor, etc.; the encapsulation film 72 may be a single-layer or multi-layer structure, and when the encapsulation film 72 is a multi-layer structure, inorganic insulating layers and organic insulating layers may be alternately formed. But not limited to this, the display panel 7 can also be a liquid crystal display.

When the display panel 7 is an OLED display, as shown in FIG. 15 and FIG. 16, the touch-control panel 3 can be formed on the encapsulation film 72; the specific formation process of the touch-control panel 3 can refer to the above-mentioned fabrication process of the touch-control unit 31. The details are not repeated herein.

As shown in FIG. 16, the display apparatus may further include a cover plate 8, and the cover plate 8 is located on the side of the touch-control panel 3 away from the display panel 7. In the embodiment, in the touch-control panel 3, the distance h between the side of the touch-control sensing layer facing the cover plate 8 and the side of the cover plate 8 away from the touch-control sensing layer may be less than 200 μm. That is, the touch-control panel 3 can be applied in an ultra-thin stack structure, which not only ensures the touch-control performance, but also makes the display apparatus have certain flexibility, which is convenient for bending and curling. But not limited to this, the touch-control panel 3 can be applied to a thicker stack structure. That is, in the touch-control panel 3, the distance h between the side of the touch-control sensing layer facing the cover plate 8 and the side of the cover plate 8 away from the touch-control sensing layer may be greater than or equal to 200 μm, for example, 500 μm or more. That is to say, the touch-control panel 3 can be applied to any display apparatus, which has a wide range of application.

According to the embodiments of the present disclosure, the specific type of the display apparatus is not particularly limited, and any type of display apparatus commonly used in the art can be used, such as displays, mobile devices such as mobile phones and notebook computers, wearable devices such as watches, wristbands, VR devices, etc. Those skilled in the art can select correspondingly according to the specific use of the display apparatus, and details are not repeated herein.

It should be noted that in addition to the display panel 7, the touch-control panel 3 and the cover plate 8, the display apparatus also includes other necessary parts and components. Taking the display as an example, it may also include a main circuit board (i.e.: a main board), a casing, power cord, etc., and those skilled in the art can make corresponding supplements according to the specific usage requirements of the display apparatus, which will not be repeated herein.

Those skilled in the art will easily think of other embodiments of the present disclosure after considering the specification and practicing the disclosure disclosed herein. This disclosure is intended to cover any variations, uses, or adaptive changes of the present disclosure. These variations, uses, or adaptive changes follow the general principles of the present disclosure and include common knowledge or conventional technical means in the technical field that are not disclosed in the present disclosure. The description and the embodiments are only regarded as exemplary, and the true scope and spirit of the present disclosure are indicated by the appended claims.

What is claimed is:

1. A touch-control panel, comprising:
a substrate and a touch-control sensing layer located on the substrate, wherein:
the touch-control sensing layer comprises a plurality of touch-control units, each of the touch-control units comprises at least one touch-control pattern, the touch-control pattern comprises a first touch-control electrode, and a second touch-control electrode that are insulated from each other;
the first touch-control electrode has at least one group of first touch-control group, and the first touch-control group comprises a plurality of first touch-control branches and first conductive connection portions connected to one end of the plurality of first touch-control branches;
the second touch-control electrode has at least one group of second touch-control group, the second touch-control group comprises a plurality of second touch-control branches and second conductive connection portions connected to one end of the plurality of second touch-control branches, and the second touch-control branches and the first touch-control branches are arranged alternately in a first direction and are spaced apart from each other;
at least one of surfaces of the first touch-control branches opposite to the second touch-control branches are wave-shaped surfaces, and surfaces of the second touch-control branches opposite to the first touch-control branches are wave-shaped surfaces;
the wave-shaped surface is formed by splicing a plurality of tooth portions arranged in a second direction, and the second direction intersects with the first direction;
the tooth portion is triangular, and an included angle between a side surface of the tooth portion and a plane where the first direction is located is 5° to 95°;
the touch-control unit has a first center line extending in the first direction and a second center line extending in a second direction, the second direction and the first direction are perpendicular to each other; and a plurality of the touch-control patterns are provided in the touch-control unit, and the touch-control units are arranged in a mirror image with respect to at least one of the first center line and the second center line;
four touch-control patterns are provided in the touch-control unit, and the four touch-control patterns are arranged in an array in the first direction and the second direction; adjacent touch-control patterns in the first direction share the first touch-control branch located at an edge, and the first touch-control branches located at the edge of the adjacent touch-control patterns in the second direction are directly connected, adjacent touch-control patterns in the second direction share the second conductive connection portion, and the second conductive connection portions between adjacent touch-control patterns in the first direction are connected through a conductive bridge, and the conductive bridge and the first touch-control electrode are insulated from each other; and
the touch-control unit is arranged in a mirror image with respect to the first center line, and each touch-control pattern further comprises a second dummy electrode insulated from the first touch-control electrode and the second touch-control electrode, and the second dummy electrode is located in an edge region of the touch-control pattern away from the second center line.

2. The touch-control panel according to claim 1, wherein opposite surfaces of the first touch-control branch in the first direction are both wave-shaped surfaces; opposite surfaces of the second touch-control branch in the first direction are both wave-shaped surfaces.

3. The touch-control panel according to claim 2, wherein tooth portions of the adjacent first touch-control branch and second touch-control branch are engaged with each other.

4. The touch-control panel according to claim 3, wherein:
sizes and shapes of the tooth portions of the first touch-control branch are identical with sizes and shapes of the tooth portions of the second touch-control branch; and
each part in a channel formed between the adjacent first touch-control branch and second touch-control branch has an identical size in the first direction.

5. The touch-control panel according to claim 3, wherein:
tooth portions on opposite sides of the first touch-control branch in the first direction are arranged in a staggered manner; and
tooth portions on opposite sides of the second touch-control branch in the first direction are arranged in a staggered manner.

6. The touch-control panel according to claim 1, wherein:
in the first touch-control electrode of each of the touch-control patterns, there are a plurality of groups of the first touch-control groups arranged in sequence in the first direction, and the first conductive connection portions of the adjacent first touch-control groups are connected with each other;
in the second touch-control electrode of each of the touch-control patterns, there are a plurality of groups of the second touch-control groups arranged in sequence in the first direction, and the first conductive connection portions of the adjacent second touch-control groups are connected with each other; and
the second touch-control branches close to each other between the adjacent second touch-control groups are located between the adjacent first touch-control groups, and one ends of the second touch-control branches that are close to each other between the adjacent second touch-control groups close to the first conductive connection portion are connected through a third conductive connection portion, to form a closed annular space.

7. The touch-control panel according to claim 6, wherein a first dummy electrode insulated from the second touch-control electrode is provided in the closed annular space.

8. The touch-control panel according to claim 1, wherein:
the plurality of touch-control units are arranged in an array in the first direction and the second direction, and the second conductive connection portions between the adjacent touch-control units in the first direction are connected to form an entire column of touch-control units, and the first conductive connection portions between the adjacent touch-control units in the second direction are connected to form an entire row of touch-control units; and
the second conductive connection portions in the entire column of touch-control units are connected to a chip at least through a lead; the first conductive connection portions in the entire row of touch-control units are connected to the chip at least through a lead.

9. The touch-control panel according to claim 8, wherein, the chip is located at one end of the touch-control panel in the first direction, and the second conductive connection portion of a touch-control unit close to the chip in the entire column of touch-control units is connected to the chip through a lead, and the second conductive connection portion of a touch-control unit away from the chip in the entire column of touch-control units is connected to the chip through another lead.

10. The touch-control panel according to claim 1, wherein:
the first touch-control electrode and the second touch-control electrode are both metal electrodes; and
orthographic projections of the first touch-control branch, the first conductive connection portion, the second touch-control branch and the second conductive connection portion on the substrate are all grid-shaped, and each grid is configured to correspond to one sub-pixel.

11. A touch-control display apparatus, comprising:
a display panel and a touch-control panel, wherein:
the touch-control panel comprises a substrate and a touch-control sensing layer located on the substrate, the touch-control sensing layer comprises a plurality of touch-control units, each of the touch-control units comprises at least one touch-control pattern, the touch-control pattern comprises a first touch-control electrode, and a second touch-control electrode that are insulated from each other;
the first touch-control electrode has at least one group of first touch-control group, and the first touch-control group comprises a plurality of first touch-control branches and first conductive connection portions connected to one end of the plurality of first touch-control branches;
the second touch-control electrode has at least one group of second touch-control group, the second touch-control group comprises a plurality of second touch-control branches and second conductive connection portions connected to one end of the plurality of second touch-control branches, and the second touch-control branches and the first touch-control branches are arranged alternately in a first direction and are spaced apart from each other;
at least one of surfaces of the first touch-control branches opposite to the second touch-control branches are wave-shaped surfaces, and surfaces of the second touch-control branches opposite to the first touch-control branches are wave-shaped surfaces;
the touch-control panel is located at a display side of the display panel;
the wave-shaped surface is formed by splicing a plurality of tooth portions arranged in a second direction, and the second direction intersects with the first direction;
the tooth portion is triangular, and an included angle between a side surface of the tooth portion and a plane where the first direction is located is 5° to 95°;
the touch-control unit has a first center line extending in the first direction and a second center line extending in a second direction, the second direction and the first direction are perpendicular to each other; and a plurality of the touch-control patterns are provided in the touch-control unit, and the touch-control units are arranged in a mirror image with respect to at least one of the first center line and the second center line,
four touch-control patterns are provided in the touch-control unit, and the four touch-control patterns are arranged in an array in the first direction and the second direction: adjacent touch-control patterns in the first direction share the first touch-control branch located at an edge, and the first touch-control branches located at the edge of the adjacent touch-control patterns in the second direction are directly connected, adjacent touch-control patterns in the second direction share the second conductive connection portion, and the second conductive connection portions between adjacent touch-control patterns in the first direction are connected through a conductive bridge, and the conductive bridge and the first touch-control electrode are insulated from each other; and the touch-control unit is arranged in a mirror image with respect to the first center line, and each touch-control pattern further comprises a second dummy electrode insulated from the first touch-control electrode and the second touch-control electrode, and the second dummy electrode is located in an edge region of the touch-control pattern away from the second center line.

12. The touch-control display apparatus according to claim 11, wherein:

opposite surfaces of the first touch-control branch in the first direction are both wave-shaped surfaces; and opposite surfaces of the second touch-control branch in the first direction are both wave-shaped surfaces.

13. The touch-control display apparatus according to claim 12, wherein tooth portions of the adjacent first touch-control branch and second touch-control branch are engaged with each other.

14. The touch-control display apparatus according to claim 13, wherein:

sizes and shapes of the tooth portions of the first touch-control branch are identical with sizes and shapes of the tooth portions of the second touch-control branch; and each part in a channel formed between the adjacent first touch-control branch and second touch-control branch has an identical size in the first direction.

15. The touch-control display apparatus according to claim 13, wherein:

tooth portions on opposite sides of the first touch-control branch in the first direction are arranged in a staggered manner; and tooth portions on opposite sides of the second touch-control branch in the first direction are arranged in a staggered manner.

* * * * *